(12) United States Patent
Kallakuri

(10) Patent No.: US 12,717,645 B1
(45) Date of Patent: Aug. 25, 2026

(54) DISCONNECTED TASK RESTARTS VIA SITUATIONAL DISTRIBUTED CONTROL

(71) Applicant: Amazon Technologies, Inc., Seattle, WA (US)

(72) Inventor: Kumar Deepak Syam Kallakuri, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 778 days.

(21) Appl. No.: 17/700,792

(22) Filed: Mar. 22, 2022

(51) Int. Cl.
*G06F 9/50* (2006.01)
*G06F 11/07* (2006.01)

(52) U.S. Cl.
CPC .......... *G06F 9/5077* (2013.01); *G06F 9/5038* (2013.01); *G06F 9/5044* (2013.01); *G06F 11/0772* (2013.01); *G06F 11/0793* (2013.01)

(58) Field of Classification Search
CPC .... G06F 9/5077; G06F 9/5038; G06F 9/5044; G06F 11/0772; G06F 11/0793
USPC .......................................................... 718/104
See application file for complete search history.

(56) References Cited

U.S. PATENT DOCUMENTS 8,296,599 B1 * 10/2012 Boyer ................ G06F 11/2046 714/4.11
11,614,957 B1 * 3/2023 Mandadi .............. G06F 9/5016 718/1
2002/0107906 A1 * 8/2002 Brockbank ............... H04L 9/40 709/203
2009/0144526 A1 * 6/2009 Cizas ........................ G06F 9/54 712/214
2014/0149590 A1 * 5/2014 Mallipeddi ........... G06F 9/5061 709/226
2016/0132214 A1 * 5/2016 Koushik .................. G06F 8/61 715/741
2017/0141957 A1 * 5/2017 Lim .................... H04L 12/4641
2018/0248973 A1 * 8/2018 Cook ...................... H04L 63/08
2019/0116110 A1 * 4/2019 Raney ........................ G06F 8/60
2019/0171532 A1 * 6/2019 Abadi ................. H04L 67/1095
2019/0361748 A1 * 11/2019 Walters ................... H04L 67/10
2020/0174843 A1 * 6/2020 Ruan ..................... G06F 9/5072
2020/0409339 A1 * 12/2020 Arashanipalai ....... G06F 16/906
2021/0263805 A1 * 8/2021 Chopra ................. G06F 11/076
(Continued)

FOREIGN PATENT DOCUMENTS

CN 106936636 B * 8/2019 ......... G06F 9/45558

*Primary Examiner* — April Y Blair
*Assistant Examiner* — Ross Michael Vincent
(74) *Attorney, Agent, or Firm* — Nicholson DeVos Webster & Elliott LLP

(57) ABSTRACT

Techniques for disconnected remote task restarts via situational distributed control are described. A container instance operates in a cluster of container instances that is remote from a control plane. Each agents of the container instances can be configured with a control module that provides purposefully limited control plane functionalities that are activated in specific scenarios. Each agent can be configured, by the control plane, with mappings indicative of other agents—and their currently-executing tasks—that the agent is to serve as a backup control plane for. Upon a failure associated with an agent coupled with a lack of network connectivity from the cluster to the control plane, another agent can become a backup control plane to restart task execution for the affected agent.

20 Claims, 8 Drawing Sheets

(56) References Cited

U.S. PATENT DOCUMENTS

| | | | | |
|---|---|---|---|---|
| 2021/0271565 | A1* | 9/2021 | Bhavanarushi | G06F 9/45558 |
| 2021/0282202 | A1* | 9/2021 | Vikberg | H04W 76/22 |
| 2022/0229678 | A1* | 7/2022 | Beard | G06F 9/45558 |
| 2022/0318096 | A1* | 10/2022 | Batraev | G06F 9/45558 |
| 2022/0398151 | A1* | 12/2022 | Nandavar | G06F 11/0781 |

* cited by examiner

500

RECEIVE, AT A FIRST AGENT EXECUTED AT A COMPUTING DEVICE IN A USER-MANAGED ENVIRONMENT THAT IS PHYSICALLY SEPARATE FROM A PROVIDER NETWORK, A CONFIGURATION DATA FROM A CONTROL PLANE OF THE PROVIDER NETWORK INDICATING THAT THE FIRST AGENT IS TO SERVE AS A CONTROL PLANE BACKUP FOR A SECOND AGENT THAT IS ALSO SEPARATE FROM THE PROVIDER NETWORK, WHEREIN THE FIRST AGENT IS ASSOCIATED WITH A FIRST ONE OR MORE COMPUTE TASKS LAUNCHED FROM THE CONTROL PLANE AND THE SECOND AGENT IS ASSOCIATED WITH A SECOND ONE OR MORE COMPUTE TASKS LAUNCHED FROM THE CONTROL PLANE 502

DETERMINE, BY THE FIRST AGENT, THAT A FAILURE EVENT ASSOCIATED WITH THE SECOND ONE OR MORE COMPUTE TASKS HAS OCCURRED AND THAT THE SECOND AGENT IS UNABLE TO COMMUNICATE WITH THE CONTROL PLANE OF THE PROVIDER NETWORK 504

TRANSMIT, BY THE FIRST AGENT, ONE OR MORE COMMANDS TO THE SECOND AGENT TO CAUSE THE SECOND AGENT TO AGAIN EXECUTE THE SECOND ONE OR MORE COMPUTE TASKS 506

FIG. 5

DISCONNECTED TASK RESTARTS VIA SITUATIONAL DISTRIBUTED CONTROL

BACKGROUND

Many companies and other organizations operate computer networks that interconnect numerous computing systems to support their operations. For example, data centers housing significant numbers of interconnected computing systems have become commonplace. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources. Virtualization technologies, for example, can allow a single physical computing machine to be shared among multiple users by providing each user with one or more virtual machines hosted by the single physical computing machine. As another example, virtualization technologies can allow data storage hardware to be shared among multiple users by providing each user with a virtualized data store which can be distributed across multiple data storage devices, with each such virtualized data store acting as a distinct logical data store that provides users with the illusion that they are the sole operators and administrators of the data storage resource.

A recently popular virtualization technology is application containerization. At a high level, containers are a method of operating system virtualization that allow users to run software applications and their dependencies in resource-isolated processes and in a consistent manner across different deployment environments. To enable container-based applications to run consistently across various deployment environments, a container is constructed as an atomic, self-contained package of software that includes everything needed to run the software contained therein (that is, a container includes any necessary code, runtime, libraries, packages, and so forth). The use of containers has become a popular application development and deployment tool in part because containers generally are portable, lightweight, standardized, and easy to deploy in a consistent manner regardless of deployment environment.

One distinction between a container (or “application container”) and a virtual machine is that multiple application containers (e.g., each corresponding to a different application) can be deployed over a single operating system, whereas each virtual machine typically runs its own separate operating system. Thus, containers are often less resource intensive and can facilitate better utilization of underlying host hardware resources. However, multiple application containers running on a single host are all susceptible to a host failure, which can result in failure of the entire software system that the application containers make up. Additionally, running multiple containers on a single host device can also be limited by host resource constraints. Thus, some systems run multiple containers using a collection of multiple container hosts, which can also be referred to as “container clusters.”

To simplify container deployment, the launching and managing of containers or clusters thereof can be offered as a service, e.g., by a cloud provider network. Such container-based infrastructure services can involve the delivery of container cluster management, container orchestration, and/or the underlying computational resources to end-users as a service, allowing application developers to easily deploy new container-based applications in the provider network itself or even in other computing environments, such as user-managed data centers or third-party systems.

BRIEF DESCRIPTION OF DRAWINGS

Various examples in accordance with the present disclosure will be described with reference to the drawings, in which:

FIG. 5 is a flow diagram illustrating operations of a method for disconnected task restarts via situational distributed control according to some examples.

DETAILED DESCRIPTION

Figure 1:
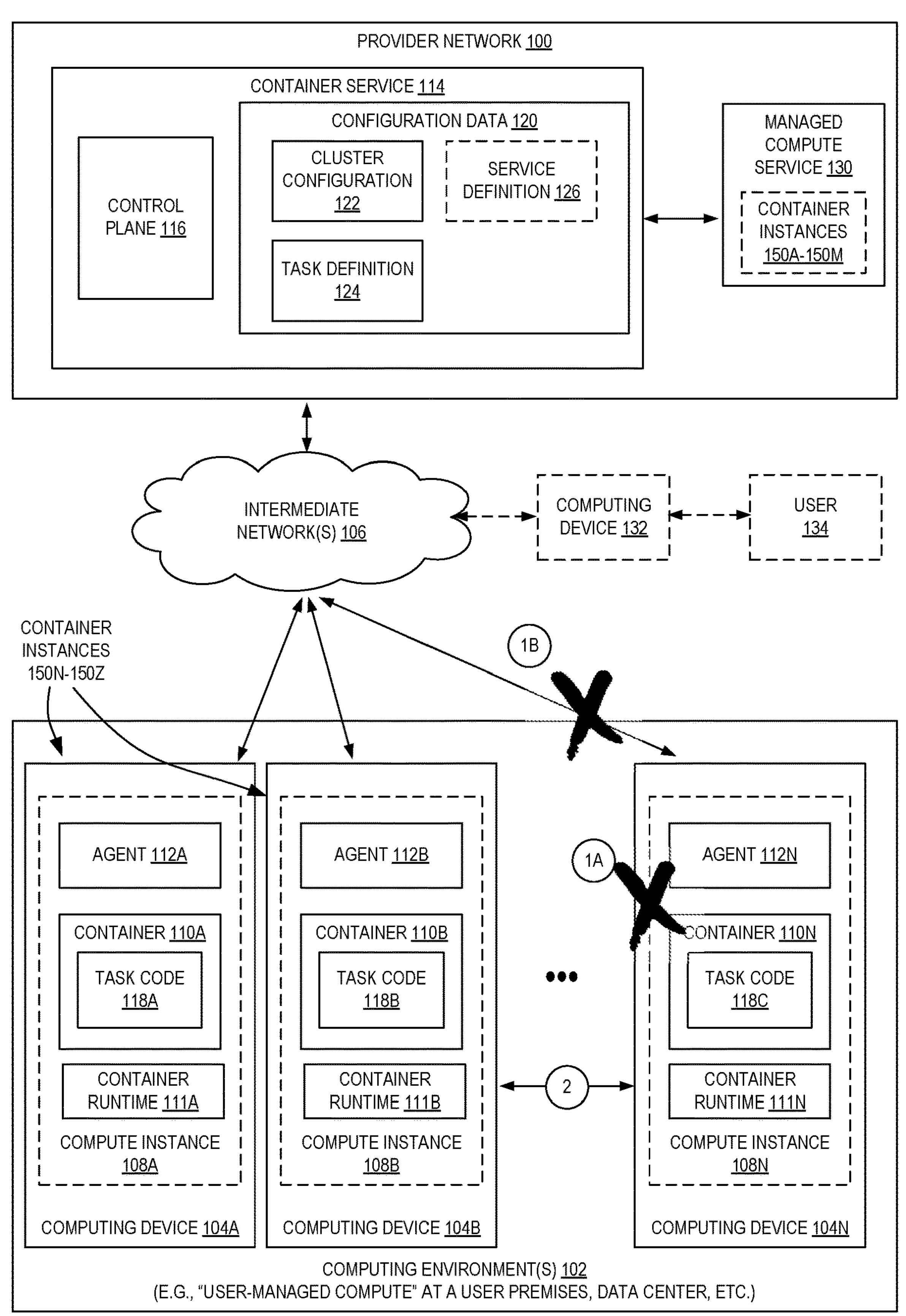
FIG. 1 is a diagram illustrating remote task restarts via situational distributed control in a remote computing environment implementing container-based task execution according to some examples.

The present disclosure relates to a distributed control plane for managing container instances running in locations that may experience network disconnection from a cloud provider network (e.g., customer on-premise networks), where the cloud provider network is responsible for at least some management tasks for the container instances. More specifically, the present disclosure relates to disconnected task restarts via situational distributed control. According to some examples, tasks being executed in computing environments that are remote from a provider network control plane can be effectively restarted after a task-impairing failure occurs during times when network connectivity between the computing environment and the control plane is impaired or does not exist.

In some examples, container instances managed by a control plane of a provider network but that execute in a separate environment (e.g., in a storefront, factory, office building) from the control plane can need to remain performant under a disconnected network mode. In many settings, these container instances can sometimes restart, perhaps due to software or hardware issues, power issues, or the like. When this happens, the applications executed by these container instances (e.g., “tasks” and/or “services”) cannot be started again after such a restart if no network connectivity to the (remote) control plane of the provider network exists. This occurs due to the purposeful and beneficial system architecture that implements control plane functionality in the provider network where it can be scaled, updated, secured, managed, etc., while the container instances can simply be deployed and execute in completely different locations.

In some examples, each container instance of a set of deployed container instances can execute an agent that can act upon the restart of another container instance in the set by causing previously running tasks to be restarted if and when an external network connectivity issue exists between the deployed container instances and the control plane of the provider network. In some examples, each agent can track the state of one or more other agents in the set, indicating what tasks each other tracked agent is currently running. An agent can thereafter use this state to identify what tasks are to be restarted upon a failure of a fellow container instance when a corresponding network issue exists (such that the restarted container instance is unable to communicate with the control plane to reinitialize itself and restart its tasks). In some examples, an agent can further maintain data needed for the task execution by other agents, such as a container image that another agent needs to launch a container instance for executing a task.

For example, in some examples, a cluster of container instances can implement "local" control for restart actions when the cluster is detached from the parent control plane. During a restart of a container instance, the associated agent can seek to check-in with the control plane or otherwise obtain resources from the control plane, such as by sending a request to download a container image for use in (again) executing its assigned tasks. When the agent can't reach the control plane, one or more "neighboring" agents executing in the same operating environment can take over and act as a minimal "local" control plane for a limited set of purposes, such as for the purpose of continuing task execution as rapidly as possible. For example, a first agent acting as a "backup" control plane for a second agent can detect the inability of the second agent to communicate with the regular control plane (e.g., by observing one or multiple unsuccessful attempts made by a restarted agent to download a container image, by observing a "restart" message broadcast throughout the local network by the restarted agent, etc.) and respond to the second agent based on its associated state, e.g., commands to begin performance of a task, a container image needed to launch a container instance, etc. Accordingly, examples can maintain performance during times of intermittent connection issues, without having to have a "full" local copy of a control plane that would require significant resources, continuing management, and the like. Thereafter, when network connectivity between the cluster and the control plane resumes, the container instances themselves can report updates to back to the control plane, e.g., indicating that a restart occurred, indicating what tasks are now running (and associated metadata), indicating collected metrics gathered and cached during the downtime, etc., allowing the overall system state to reconverge back into the normal operational mode where the control plane maintains control over the cluster.

FIG. 1 is a diagram illustrating remote task restarts via situational distributed control in a remote computing environment 102 implementing container-based task execution according to some examples. In some examples, a container service 114 and one or more managed compute services 130 (e.g., a hardware virtualization service, on-demand serverless code/container execution service, or the like), among any number of other possible services, operate as part of a multi-tenant "cloud" service provider network 100 and each can be implemented as one or more software modules executed by one or more electronic devices at one or more data centers and/or geographic locations. However, the container service 114 itself can be implemented as software, hardware, or a combination of both software and hardware, and can be implemented using one or more computing devices in a consolidated or distributed manner. A user 134 using one or more electronic computing device(s) 132 (which can be part of or separate from the service provider network 100) can interact with the various services of the service provider network 100 via one or more networks 106, such as the internet.

Thus, users of a service provider network 100 can run containerized software applications using computing resources provided or managed by the service provider network 100. A service provider network 100, for example, can include a container service 114 that provides scalable container management enabling users to run containerized software applications on managed clusters of compute instances. Using API calls or other interfaces, for example, users can use a container service 114 to launch containerized applications and to manage container placement, among other possible configurations. In other examples, a container service 114 can enable users to run containers without the user needing to explicitly provision, configure, or scale compute instance clusters upon which the containers are to execute.

As shown in FIG. 1, a container service 114 implemented in a multi-tenant provider network 100 can be a fully managed container orchestration service that helps users easily deploy, manage, and scale containerized applications within the provider network or in other, separate computing environments 102 that are external to the provider network 100. Beneficially, the container service 114 can allow users to easily deploy containerized workloads within the cloud provider network (e.g., directly or indirectly using one or more managed compute services 130 such as a hardware virtualization service) and/or "on-premises" (of the user) without requiring its users to implement or manage a control plane or the underlying nodes themselves.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the overall provider network 100 (or, to a control plane 116 for a particular service) that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a virtual machine that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

In some examples, a provider network 100 can provide a managed compute service 130 such as an on-demand code execution service (referred to in various examples as a function compute service, functions service, cloud functions service, functions as a service, or serverless computing service) that can enable users of the provider network 100 to execute their code on cloud resources without having to select or manage the underlying hardware resources used to execute the code. For example, a user can use the on-demand code execution service by uploading their code and use one or more APIs to request that the service identify, provision, and manage any resources required to run the code, such as virtual machines, containers, etc. The on-demand code execution service itself may make use of another managed compute service 130, such as a hardware virtualization service, to execute this code.

In some examples, a provider network 100 can provide a managed compute service 130 such as a hardware virtualization service (referred to in various implementations as an elastic compute service, a virtual machines service, a computing cloud service, a compute engine, or a cloud compute service) that enables users of the provider network 100 to provision and manage compute resources such as virtual machine instances. As is indicated herein, virtual machine technology can use one physical server computing device to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more processors (e.g., CPUs) that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

As introduced earlier, a container service 114 (referred to in various implementations as a container service, cloud container service, container engine, or container cloud service), such as the Amazon Elastic Container Service (ECS) ™, can be a highly scalable, high performance container management service that supports containers (e.g., Docker containers) and allows users to easily run applications on a managed cluster of compute instances, eliminating the need for users to install, operate, and scale their own cluster management infrastructure. With simple API calls, users can launch and stop container-enabled applications, query the complete state of their clusters, and/or utilize provider network features such as virtual firewalls, load balancing, virtual block storage volumes, and/or Identity Access Management (IAM) roles. Users can use the container service 114 to schedule container placement across a cluster based on their unique resource needs and availability requirements or can integrate their own schedulers or third-party schedulers to meet business or application specific requirements.

At a high level, containers are a method of operating system virtualization that allow users to run an application and its dependencies in resource-isolated processes in a consistent manner across different deployment environments. To enable container-based applications to run consistently across various deployment environments, containers are constructed as atomic, self-contained packages of software that include everything needed to run the software contained therein—thus, a container can include any necessary code, runtime, libraries, packages, and so forth. The use of containers has become a popular application development and deployment tool at least in part because containers are generally portable, lightweight, standardized, and easy to deploy in a consistent manner regardless of deployment environment.

Containers can be created based on a read-only template called a container image. A container image is a standalone, executable package of software that includes everything needed to run an application process: code, runtime, system tools, system libraries and settings. Container images become containers at runtime. Container images are typically built from a plaintext file (e.g., a Dockerfile) configured by a user that specifies the components that are to be included in the container. After being built, the container images can be stored in a registry where they then can be downloaded and run. As is known to those of skill in the art, a container image can be executed by a container runtime 111, which can be installed at a host operating system, leading to the instantiation of a container. Depending on the format of the container image, any of a number of available container runtimes can be used including, for example, container runtimes provided by the Docker® or other container platforms. A container image can generally be treated as read-only data by a container runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies.

To prepare an application to be run using the container service 114, in some examples a user can define or provision a cluster, create a task or service definition, and/or provide associated configuration data that the container service 114 can use to manage the execution of user's application.

A cluster is a logical grouping of execution resources that can be used to execute one or multiple tasks and/or services. A user can register one or more compute resources (e.g., compute instances such as virtual machines, physical computing devices, etc.) as being associated with a cluster and thus become available for use to run "tasks" upon. A compute instance can be used somewhat synonymously with the term "container instance," though the latter can refer more specifically to an execution resource (e.g., a compute instance or physical host) that is running a container agent 112, has a container runtime 111A-111N installed, and has been registered into a cluster. In some examples, container instances 150A-150M can be hosted within the provider network 100, such as via use of one or more managed compute services 130.

However, in some examples, a container service 114 provides support for registering "external instances" to a cluster that execute in a separate computing environment 102 (e.g., at a premises of an organization) that is distinct from the provider network 100 and that thus is part of a user-managed compute environment, where the user may be a customer of the provider network or a third party. These external container instances 150N-150Z can be in the form of a server computing device (e.g., computing device 104A) or virtual machine (e.g., compute instance 108A), and can be particularly useful for running applications that generate outbound traffic or process data, though external instances can also easily support services that actively process inbound traffic.

Thus, via a console application (e.g., a web-based application or custom application) or API, a user 134 can utilize a computing device (e.g., computing device 132) to send commands to the container service 114 (e.g., a "create-cluster" type command) to create or configure a cluster and to associate container instances with the cluster. Metadata provided by the user in the command(s) and/or generated by the container service 114 can be stored as cluster configuration data 122, for example, a cluster name, identifiers of networking information associated with the cluster such as a subnet or private network that they operate within, tags associated with the cluster, operational configurations such as associated services—like monitoring, auto-scaling, etc. —to be enabled for the cluster, etc.

In some examples, the user can have installed a container agent 112 upon each compute instance or computing device (to qualify it as a "container instance" available for assignment into a cluster), or the particular compute instance or computing device can be pre-allocated with a container agent 112 by the container service 114 (e.g., by launching a virtual machine compute instance using a machine image having the agent thereupon). Alternatively, or additionally, a new compute instance can be deployed and/or configured as a container instance when being added to a cluster, such as via the user submitting a command to both obtain a compute instance (e.g., from a managed compute service 130) and add it to the cluster.

A cluster of container instances can thus be used to execute some portion of application code, referred to herein as a "task." Thus, the term "task" is generally used in a broad manner to refer to a set of computing operations of some type associated with an application. For example, in some examples, a "task" can be a portion of a software application (or the entirety of the application) that is to be run using one or more containers. A user 134 may, in some examples, issue one or more commands (e.g., a "register-task-definition" command) to create a task definition 124 representing a portion of an application the user wishes to run, which can be stored as part of configuration data 120 as task definition 124.

For example, the user 134 can specify parameters to be part of a task definition 124 such as an identifier of a container image to use with each container in the task, amounts and/or types of computing resources (e.g., CPU, memory) to use with each task or each container within a task, a launch type to use that identifies the infrastructure on which the tasks are hosted (e.g., a hardware virtualization service, an on-demand serverless execution service, an "external" launch type indicating that the task is to be run on an external container instance that is remote from the service provider network), a logging configuration to use for the tasks, an indicator of whether the task should continue to run if the container finishes or fails, a command that the container should run when it is started, identifiers of any data volumes that should be used with the containers in the task, an IAM role that the tasks should use, etc. In some examples, a user can define (or include) one or multiple containers in a single task definition. However, a user's entire application stack does not need to be on within a single task definition, and instead the application can span multiple task definitions where the user combines related containers into their own task definitions, each representing a single component of the application.

Accordingly, in some examples, a task definition can be text (e.g., in JavaScript Object Notation (JSON) format) that describes one or more containers that form an application. The task definition can be thought of as a blueprint for the application as it specifies various parameters for the application, which can indicate which containers should be used, which ports should be opened for the application, what data volumes should be used with the containers in the task, etc. The specific parameters available for a task definition depend on the needs of the specific application. A "task instance" (or just "task") can thus represent the instantiation of a task definition within a cluster. After a user has created a task definition for an application, the user can specify the number of tasks to run on the cluster.

Similarly, users can provide configuration data to define services as part of a service definition 126, where a service is an abstraction related to long running applications that allows the user to run and maintain a specified number of instances of a task definition simultaneously. Thus, if any of the tasks of a cluster should fail or stop for any reason, the container service can launch another instance of the task definition to replace it in order to maintain the desired number of tasks in the service. In some examples, a service can also run behind a load balancer that distributes request traffic across the tasks that are associated with the service.

With this configuration data 120, a container task scheduler (of the control plane 116 of the container service 114) is responsible for placing tasks within a cluster. There are several different scheduling options that can be used, for example, a user can define a service that runs and maintains a specified number of tasks simultaneously.

As described herein, a container agent 112A-112N can be a software module that runs on each compute instance 108 within a cluster and can send information to the control plane about the instance's current running tasks, resource utilization amounts (e.g., CPU, memory, networking), etc., and can start and stop tasks whenever it receives a request to do so from the control plane. Thus, it can perform local actions under the control of the control plane 116 (e.g., responsive to commands sent by the control plane or configurations initiated from the control plane) and can report back metadata to the control plane 116 or a separate monitoring or logging service of the provider network 100.

As indicated herein, in some examples a user 134 can run tasks using a cluster of container instances in the form of compute instances 108A-108N and/or computing devices 104A-104N (e.g., Point of Sale (POS) devices) executing at a computing environment 102 at a separate physical location (or set of locations) than that of the provider network 100, such as at a storefront, factory, corporate office, distribution center, data center, or the like.

However, one key issue with these locations (as compared to provider network 100 locations) is that they are often exposed at a comparatively much larger extent to vulnerabilities such as power outages, internet/network outages, and the like. For example, in the case of a network outage (e.g., from an Internet Service Provider (ISP) servicing the computing environment 102, from a network misconfiguration, network attack, or the like) leading to a temporary or complete failure of network connectivity between the cluster and the provider network 100, the cluster of instances can experience various performance issues depending on the architecture of the implementation.

For example, in some implementations, when a compute instance is launched or a computing device is started up, it executes an agent 112 that will attempt to contact or "check in" with the (remote) control plane 116 of the container service 114, for example, to determine which, if any, tasks it should be executing and/or obtain container image(s) to run. Notably, by design, in many systems this information is purposefully not physically stored locally at the computing device itself due to the device not having available or sufficient non-volatile storage, the task no longer needing to be run, security considerations, or the like. Instead, the logically centralized control plane 116 is designed to manage the task execution across various instances of a cluster in a more synchronous and ongoing manner.

However, in the event of an issue with the compute instance or computing device leading to a halt in the execution of a task—such as a power outage, fault or failure associated with an underlying operating system or container runtime or event task code, etc.—when the instance and agent 112 are again ready to actively perform work, the agent 112 may not be able to contact the control plane and thus cannot determine what tasks it should be running and/or may not be able to obtain the task code 118 (e.g., a container image that can be launched to run the task, a set of instructions, an executable, etc.) from the provider network or other remote location. Thus, the compute instance or computing device can sit idly by, unable to perform meaningful work, awaiting the restoration of network connectivity with the control plane so that it can again determine what it needs to do and obtain any needed resources to perform those tasks. Clearly, this is problematic as these tasks can need to be operational (e.g., the tasks can implement functionality for a retail POS system that needs to be actively utilized during periods of network unavailability) or would benefit from continued operation (e.g., a time-sensitive task could be completed much sooner) in the meantime.

According to examples described herein, a set of agents 112A-112N deployed as part of a cluster of instances 150N-150Z can each include a control module implementing a minimal set of functionalities of the control plane 116 that allows these agents to temporarily act in place of the control plane 116 in certain, limited circumstances. In some scenarios where the control plane is needed but is unable to be reached from the computing environment 102—such as when a compute instance 108N or computing device 104N or container runtime 111N experiences a fault and a restart occurs as shown in FIG. 1 by circle (1A), while connectivity with the remote control plane 116 is impacted as shown by circle (1B)—another agent (e.g., agent 112B) can act in place of the remote control plane 116 to cause, as shown by circle (2), the container instance to quickly again continue work in task execution.

For example, in some examples, ones of the agents 112 can determine that a fault condition exists (e.g., that another agent 112N has restarted, or is seeking instructions from the remote control plane 116) and that this other agent 112N cannot effectively communicate with the control plane 116, and therefore act in place of the control plane by commanding the other agent 112N, at circle (2), to rapidly resume operations without needing to wait for the network connectivity to the control plane to be resolved, which could require seconds, minutes, hours, or even days. For example, an agent (e.g., agent 112B) can determine it is to act as a limited control plane upon the detection of the fault and network issue and send a command to the affected agent 112N to execute a particular container and can even provide a container image to the agent 112N for use (or otherwise tell the agent 112N where to obtain the necessary container image). Accordingly, overall system performance can be substantially improved via significantly reduced processing downtime.

Figure 2:
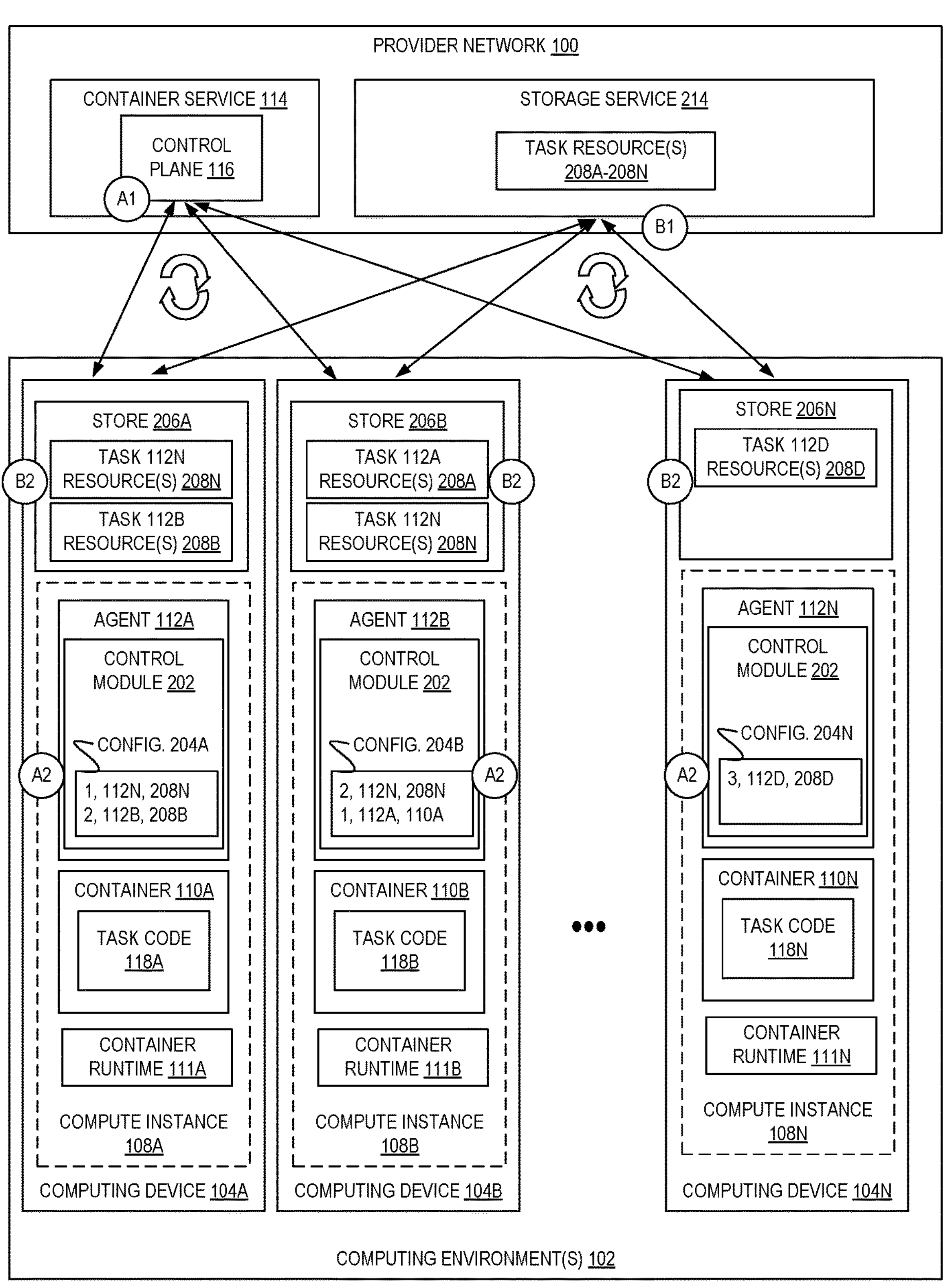
FIG. 2 is a diagram illustrating agent configuration operations for remote task restarts via situational distributed control in a remote computing environment implementing container-based task execution according to some examples.

FIG. 2 is a diagram illustrating agent configuration operations for remote task restarts via situational distributed control in a remote computing environment implementing container-based task execution according to some examples. In some examples, an agent 112 of a container instance is adapted with a control module 202 that acts, in limited circumstances, to perform a limited set of control plane type operations on behalf of the control plane 116 to positively affect the execution of tasks within a remote computing environment 102.

For example, the control plane 116 at circle (A1) can configure one or multiple agents 112 of container instances with configuration information 204 at circle (A2) that allows each agent 112 to perform limited control plane functionalities, thus forming something akin to a support mesh. For example, the configuration information 204 can include an identifier of another agent (or container instance), together with information indicating what tasks the agent is to be performing, such as an identifier of a particular task resource (e.g., container image, application, function, etc.) that agent is to utilize. Thus, the configuration information 204 can include a mapping between an identifier of another agent and the task(s) it is performing. The configuration information 204 can be stored in a variety of formats, such as in a lookup table, a formatted text file (e.g., a CSV or TSV), database, or the like, allowing for relatively rapid lookups.

In some examples, the configuration information 204 can further include priority and/or backup type information indicating when and/or how that configured agent (e.g., agent 112A) is to begin performing control plane functionalities with respect to another particular agent (e.g., agent 112N). For example, the control plane 116 can configure a more "nearby" agent (e.g., one that executes on a same computing device 104, same rack, in a same room or building, in a same local network segment, etc.) to serve as a more primary/immediate backup while having a more remote agent (or agents) be configured as secondary backup agents—this can allow for the most rapid restarts.

The configuration information 204, in some examples, includes an ordering value (e.g., an integer or boolean) identifying an ordering in which that agent is to assume primary responsibility (or, attempt to assume responsibility) for acting as the control plane for another agent vis-a-vis other agents in the cluster. For example, the value can be an integer indicating a ranking (e.g., first, second) in which the agent is to serve as a control plane stand-in. Thus, in the event of detecting that a failure condition exists (e.g., a restart of a container instance) and that the associated agent (e.g., agent 112N) cannot communicate with the control plane 116 of the provider network 100, an agent an ordering value of "1" can be the first agent to attempt to act as the control plane and thus restart the execution of that agent's associated task, whereas if it has an ordering value of "2" the agent can wait for another agent to attempt to act as the control plane first, and only upon an amount of time passing or some other detected failure of the primary backup control plane agent to act, would the agent then act. In some examples, the ordering value can be a boolean (e.g., 1 or true meaning the agent is to be a primary backup agent and 0 or false meaning the agent is to be a secondary backup agent) or another type of data value that conveys to the agent if and when it should act as a control plane.

In the illustrated example, the configuration information 204A for the first agent 112A includes two entries, where each entry identifies an ordering value, an identifier of another agent, and an identifier of a task resource associated with the other agent. Thus, a first entry of (1, 112N, 208N) indicates that agent 112A is to be the primary backup control plane (via the first ordering value of "1") for agent 112N (via the second value, which can in reality be a hostname, network address, or the like) and that this agent 112N is to be executing a task via use a particular set of task resources 208N (e.g., a container image that can be launched). Likewise, a second entry indicates that the agent 112A is to be a secondary backup control plane (via the first ordering value of "2") for agent 112B (via the second value, which again can in reality be a hostname, network address, or the like) and that this agent 112B is to be executing a task via use a particular set of task resources 208B. At the same time, another agent 112N is configured with only a single backup responsibility in the form of being a secondary (here, a "third") backup control plane for a non-illustrated agent 112D.

In the case of the utilization of multiple control plane backup agents (i.e., where more than one agent is configured as a backup for a single agent), the multiple backup agents can be configured using ordering values used to indicate how and/or when the backup agents attempt to act as a control plane. In some examples an ordering value indicates an amount of time that the configured agent is to wait before attempting to act as a local control plane (e.g., provided that it determines no other agent has yet acted, such as by not receiving a "configuration success" message sent by the agent 112N indicating that it has been brought online for processing, by seeing additional requests for assistance by the agent 112N, by not seeing control plane traffic from other agents, etc.). For example, a "primary" backup control plane agent can immediately attempt to send commands to a fault-associated agent upon detecting the failure condition and the lack of remote control plane connectivity, while an agent configured as a secondary (or tertiary, et seq.) backup control plane can wait an amount of time (e.g., two seconds for a second backup agent, five seconds for a third backup agent, etc.) before attempting to act. This configuration can allow a secondary backup agent to handle a failure of the primary backup agent, and via such a "wait and then act" scheme can beneficially be implemented without the need for all agents to continually monitor the operational status of all other agents. However, in some scenarios it can be beneficial for the agents to be aware of the operational status of the other agents (e.g., via sending each other heartbeat type messages, etc.) and thus a "secondary" backup (e.g., second backup agent, third backup agent, or the like) might be able to more rapidly respond to a failure-associated agent (e.g., by not waiting) if it knows that a more "primary" backup agent is not functional, enabling even faster recovery.

Accordingly, the agents 112A-112N can be configured by the control plane 116 (at circles (A1)-(A2)) with configuration information according to a schedule, or on an event-driven basis (e.g., upon a new or updated task being assigned to an agent, upon an agent completing a task, etc.), to allow each agent 112A to have a near-immediate updated understanding of which tasks are currently being performed by which agents. And, beneficially, this configuration mapping information 204 can be stored in a very small data structure (which can even be stored in compressed form), and the control modules 202 can be quite simple (and thus lightweight in terms of execution, storage, and/or memory needs) due to the need to only perform a very limited subset of the control plane 116 functionality. Thus, no substantial additional burden is placed on each agent 112/container instance, while substantial benefits do result in the form of rapid restarts of task executions in environments where connectivity to the (remote) control plane 116 may not exist.

Optionally, in some examples, upon being configured with configuration information 204, the agent 112 can analyze the configuration information 204 to obtain task resources that would be needed by the associated agents for task execution. For example, the agent 112 can identify associated task resources via an identifier of a task, container image, etc., within the configuration information 204, and download these resources (e.g., ones of task resources 208A-208N) at circle (B1) from a remote location (e.g., an object storage service 214 of the provider network 100, or some other network location such as a third party repository system) and keep them, at circle (B2), in a cache (e.g., data store 206, such as a non-volatile storage or volatile storage). Thus, upon each re-configuration having configuration information 204 that is different than a previous version thereof, the agent 112 can identify any no-longer-needed task resources and delete them from the store 206, and identify any newly-needed task resources and download them and add them to the store 206. These task resources can then be provided to a failure-associated agent by the agent 112, as the network connectivity to a remote network likely does not exist and thus the failure-associated agent can obtain the needed resources within a more private, local network of the computing environment 102.

Figure 3:
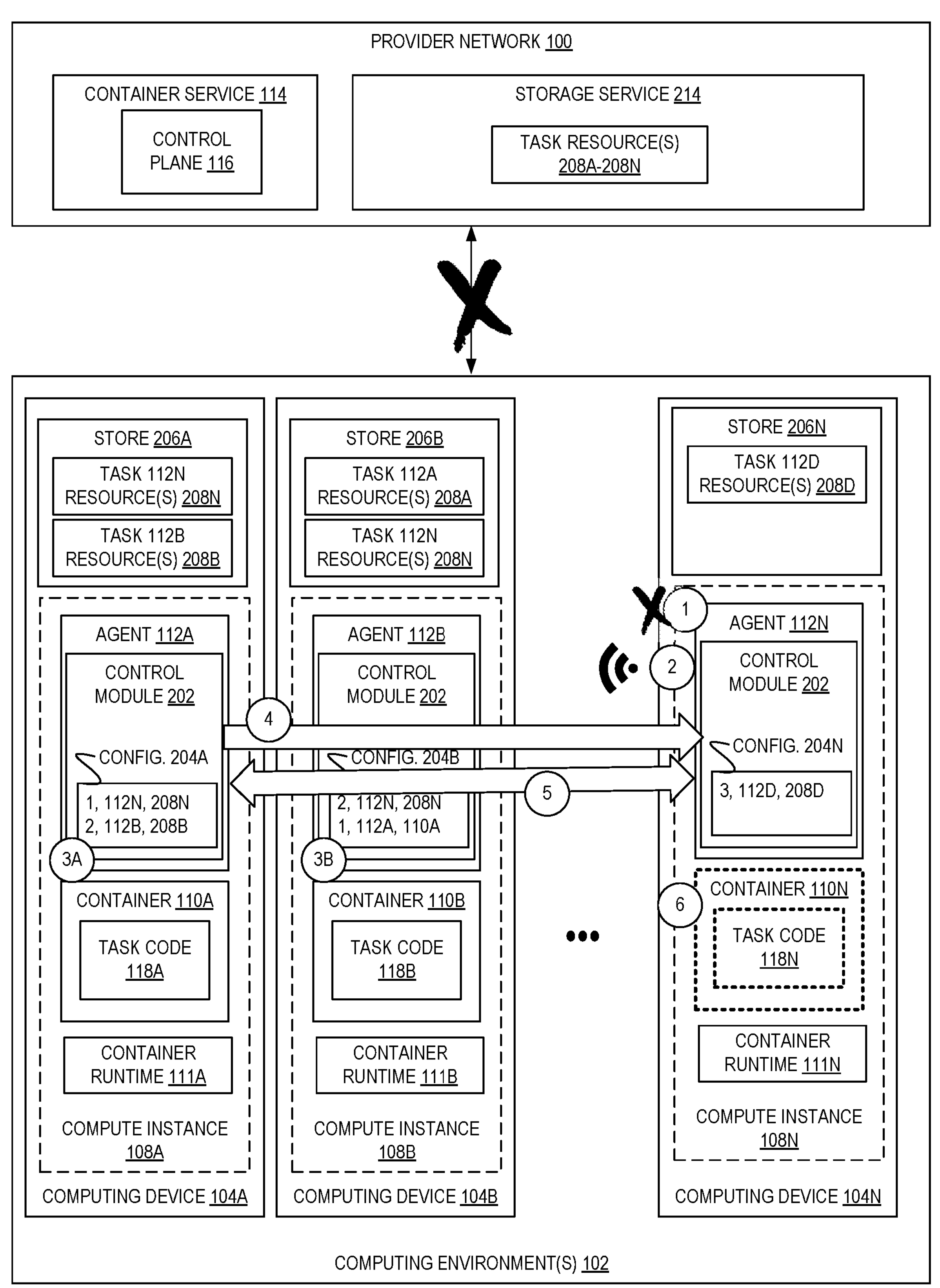
FIG. 3 is a diagram illustrating agent-based remote task restart operations in a remote computing environment implementing container-based task execution according to some examples.

For example, FIG. 3 is a diagram illustrating agent-based remote task restart operations in a remote computing environment implementing container-based task execution according to some examples. In this example, a failure associated with an agent 112N occurs at circle (1), which could include a restart of the computing device 104N, a restart or relaunch of the underlying compute instance 108N, a restart of an underlying container runtime 111N, etc. Thus, the agent 112N can attempt to connect to the (remote) control plane 116 to determine what work the agent 112N is to perform. However, in this example, a network connectivity issue occurs (e.g., a problem with the computing environment's 102 internet service provider (ISP) network, or the like) such that the agent 112N is unable to connect to the control plane 116.

As shown at circle (2), in some examples the agent 112N can determine that it cannot connect to the control plane 116 (e.g., to re-register itself into a cluster) and can issue one or more messages in a local network (e.g., via a broadcast message sent to all local devices) indicating that the agent 112N is in need of assistance, which allows the other agents 112A-112B (and likely other non-illustrated implied agents 112C-112M) to determine that the failure condition exists and/or that network connectivity issue also exists. Alternatively, in some examples the agent 112N may not issue a separate request for assistance, but instead can simply make several attempts to contact the control plane 116, and the other agents 112A-112M can be configured to be able to observe that several (unsuccessful) requests have been sent by the agent 112N through the local network seeking remote control plane 116 connectivity, and upon seeing some configured number of retries (e.g., three requests for instructions sent from another agent to the remote control plane within a period of time) these other agents can determine that the failure condition and/or lack of network connectivity exists (and thus, can act). In some examples, each agent 112 can independently deduce that the network connectivity issue exists, e.g., due to failures of their own keepalive processes (e.g., network "pings") or update messages with the control plane 116.

Accordingly, at circles (3A), (3B), etc., the other agents 112A-112M can consult their configuration information 204 to determine whether the agent is to serve as a backup for that problematic agent 112N. In this example, the first agent 112A is configured to act as a primary backup for agent 112N (per its first configuration entry) and thus it can determine it is to immediately act; similarly, the second agent 112B is configured to act as a secondary backup for agent 112N and can thus wait an amount of time before determining whether to act.

Thus, at circle (4) the control module 202 of the first agent 112A can send one or more messages carrying one or more commands to the fault-associated agent 112N to cause the agent to restart task execution. For example, the first agent 112A can have identified the associated task that the agent 112N is to be performing (according to the configuration information 204 entry task identifier, here shown as "208N" reflecting an identifier of a set of task resources 208N), and send a command to the agent 112N to perform that task. For example, the command can comprise a start-task type command that includes an identifier of the task resources 208N (e.g., directly includes a container image identifier, or a includes an identifier of a task where the associated task definition includes a container image identifier, etc.) that might be stored alongside the agent 112A (e.g., in a store 206A) of the same computing device 104A or even at a separate store within the computing environment 102 (e.g., at a network-attached storage location, at another computing device, etc.).

In some examples, upon receipt of this command, the agent 112N can determine (based on the command) that it is to execute the task resources (e.g., launch a container based on a container image task resource 208N identified by the command), and obtain the task resources 208N at circle (5) from the primary backup agent 112A (or another agent or locally accessible network location, as indicated above). This can occur via use of a resource identifier (e.g., a container name or even a full network path/URL/URI) carried in the command(s). With the retrieved task resources 208N—which it could not have gotten from the storage service 214 due to the network connectivity issue—the agent 112N can again begin to execute the task code 118N, e.g., via use of the task resources 208N (e.g., by launching a container image) at circle (6).

Figure 4:
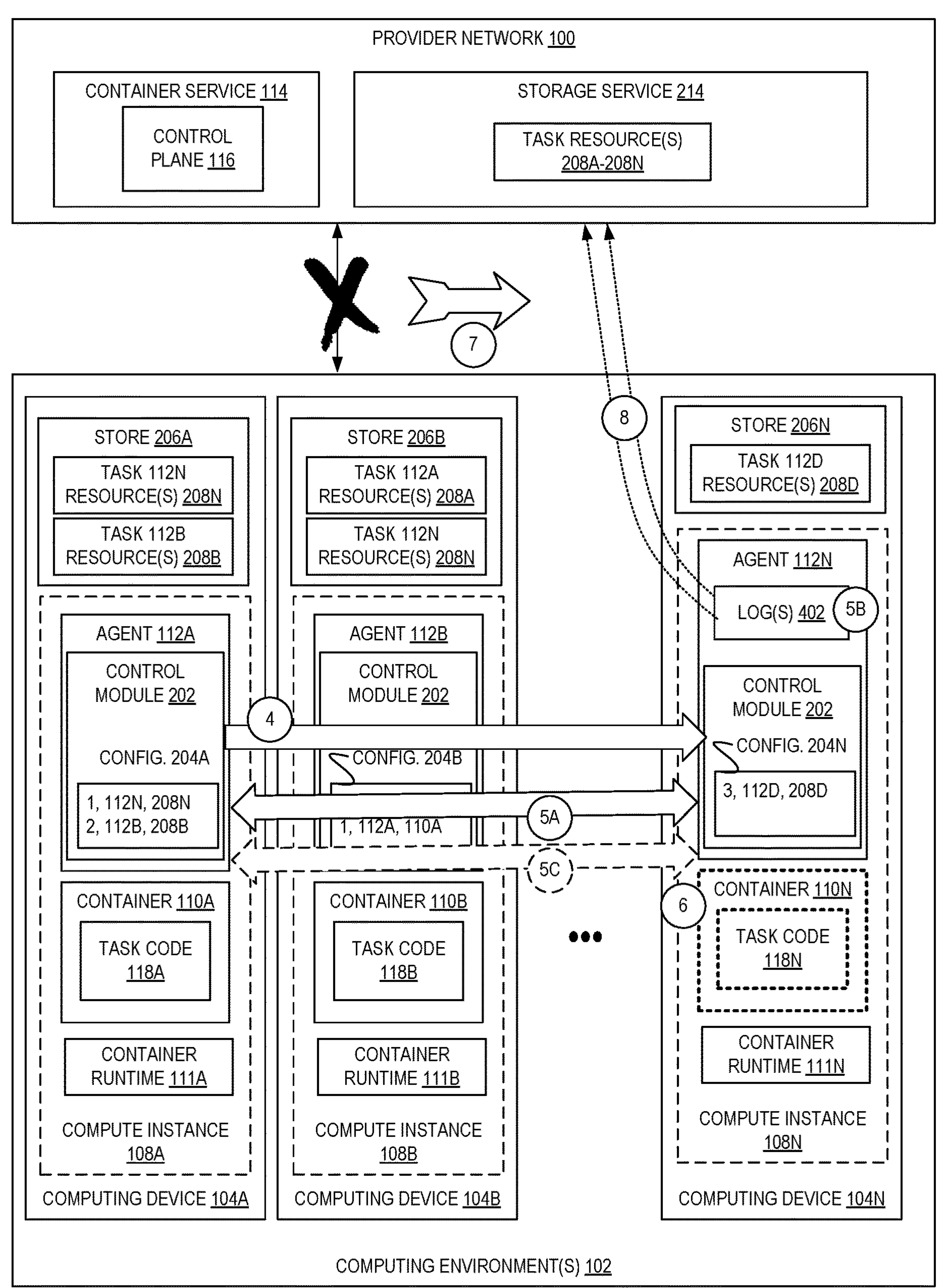
FIG. 4 is a diagram illustrating network connectivity state re-establishment according to some examples.

FIG. 4 is a diagram illustrating network connectivity state re-establishment according to some examples. Assuming the initial steps corresponding to circles (1)-(3) from FIG. 3, in this figure, as reflected by circle (4), the agent 112A can also send a command (via the same or different one or more messages) to the agent 112N to enable additional logging in logs 402, e.g., of metric type data corresponding to computing device resource utilization (e.g., processing, memory, disk, network, time, etc.), compute instance 108 resource utilization (e.g., processing, memory, disk, network, time, etc.), container 110N resource utilization (e.g., processing, memory, disk, network, time, etc.), or the like. In some systems, such metric type data or logs can typically be obtained by the agent 112N and immediately sent elsewhere for storage and/or further processing (e.g., analysis, consolidation, reporting), such as to the storage service 214, the container service 114, another analytics service, etc. However, due to the network connectivity issues, this is not realistic, and thus the agent 112N can store (at least temporarily) additional logs 402 at circle (5B). In some examples, this log data can be stored in a rolling/circular type buffer, which will thus limit the size of the storage to a most recent amount of data that can be stored with the available amount of storage space (in often resource constrained remote computing devices 104A-104N). After the container 110N is launched at circle (6), at circle (7) when network connectivity is reestablished, at circle (8) the agent 112N can send updated information back to the provider network 100, e.g., the data in the logs 402, as well as state information (indicating that the container 110N is operational, or that it was operational should it complete processing and be torn down prior to the connectivity being reestablished, or new metadata associated with the agent or container instance or container such as a new container identifier, etc.) allowing the control plane 116 to update its state and thus regain complete and correct visibility into the cluster(s) that can have been disconnected due to the outage.

Additionally, in some examples, an agent 112A serving as a backup control plane can, as shown by circle (5C), further interact with the failure-associated agent 112N to determine whether the restart of the task execution (e.g., the execution of the container 110N) was successful and potentially attempt to address any failures. For example, in some embodiments, after sending a command to restart a task as reflected by circle (5A), at a later point in time (e.g., after a configured amount of time, such as one minute) the agent 112A can send a request to the agent 112N to ask whether the restart was successful, and the failure-associated agent 112N can respond with an indication in response (e.g., "yes" or "no", or the like). Alternatively, the failure-associated agent 112N may, after executing or attempting to execute the container 110N, may itself send a message to the backup control plane agent 112A indicating the result of its attempt to restart the task. In the event of a failure, in some embodiments the agent 112A may send another command to restart the task, and this may occur one or multiple times (e.g., up to two times, up to five times, etc.) over a period of time (e.g., optionally after waiting larger and larger amounts of time between each attempt).

FIG. 5 is a flow diagram illustrating operations of a method 500 for disconnected task restarts via situational distributed control according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by an agent 112 of the other figures.

The operations 500 include, at block 502, receiving (e.g., at a first agent executed at a computing device in a user-managed environment that is physically separate from a provider network) a configuration data from a control plane of the provider network indicating that the first agent is to serve as a control plane backup for a second agent that is also separate from the provider network, where the first agent is associated with a first one or more compute tasks launched from the control plane and the second agent is associated with a second one or more compute tasks launched from the control plane.

In some examples the operations 500 further include identifying (e.g., by the first agent), prior to the determining that the that the failure event has occurred of block 504, a computing resource or a location associated with the computing resource based on the configuration data, wherein the computing resource is utilized as part of execution of the second one or more tasks; obtaining (e.g., by the first agent) the electronic resource; and caching (e.g., by the first agent) the electronic resource. In some examples, the computing resource comprises a container image, a virtual machine image, or code for an application.

The operations 500 further include, at block 504, determining (e.g., by the first agent) that a failure event associated with the second one or more compute tasks has occurred and that the second agent is unable to communicate with the control plane of the provider network.

In some examples, block 504 includes: receiving, by the first agent via a local network, a message originated by the second agent. In some examples the message originated by the second agent is destined to the control plane, and the message is unable to be successfully transmitted to the control plane; and in some examples, the message is broadcast via the local network, and the message indicates that the failure event has occurred.

In some examples, the failure event comprises a restart or fault of at least one of: a physical computing device that executes the second agent; a virtual machine instance associated with the second agent, a container; or a container runtime.

The operations 500 further include, at block 506, transmitting (e.g., by the first agent) one or more commands to the second agent to cause the second agent to again execute the second one or more compute tasks.

In some examples at least one of the one or more commands further cause the second agent to cache one or more metrics or logs associated with the execution of the second one or more compute tasks.

The operations 500 further include, in some examples, transmitting (e.g., by the first agent) the (stored/cached) computing resource to the second agent, where the second agent utilizes the computing resource to again execute the second one or more compute tasks. In some examples, though, the operations 500 include transmitting a location associated with the computing resource, where the location (e.g., a URL, URI, network address, etc.) may be associated with the first agent (or the computing device the first agent executes upon) or a completely different device or agent.

The operations 500 further include, in some examples, determining that a third agent is a higher priority control plane backup for the second agent as compared to the first agent, where transmitting the one or more commands to the third agent occurs after the third agent has failed to act as the control plane backup.

In some examples the operations 500 further include receiving, by the first agent from the control plane, a configuration update indicating that the second one or more compute tasks have completed or that the second agent is no longer associated with the second one or more compute tasks; and updating, by the first agent, a mapping data structure to remove an association between the second agent and the second one or more compute tasks.

According to some examples, another set of operations includes transmitting, by a provider network, commands to initiate execution of a first one or more compute tasks in association with a first agent and to initiate execution of a second one or more compute tasks in association with a second agent, where the first agent and the second agent execute at one or more computing devices in a user-managed environment that is physically separate from the provider network; transmitting, by the provider network to the first agent, a configuration data from a control plane of the provider network indicating that the first agent is to serve as a control plane backup for a second agent, where the first agent in serving as the control plane backup is to: determine, by the first agent, that a failure event associated with the second one or more compute tasks has occurred and that the second agent is unable to communicate with the control plane of the provider network; and transmit, by the first agent, one or more commands to the second agent to cause the second agent to again execute the second one or more compute tasks. In some examples, the first agent in serving as the control plane backup is further to: transmit, by the first agent to the second agent, a computing resource or a location associated with the computing resource, wherein the second agent utilizes the computing resource to again execute the second one or more compute tasks. In some examples, the first agent in serving as the control plane backup is further to: identify, by the first agent prior to the determining that the that the failure event has occurred, the computing resource or the location associated with the computing resource based on the configuration data; obtain, by the first agent, the electronic resource; and cache, by the first agent, the electronic resource, wherein the transmission of the computing resource or the location of the computing resource to the second agent includes a transmission of the computing resource. In some examples, the computing resource comprises a container image, a virtual machine image, or code for an application. In some examples, the failure event comprises a restart or fault of at least one of: a physical computing device that executes the second agent; a virtual machine instance associated with the second agent; a container; or a container runtime.

In some examples, to determine that the failure event has occurred the first agent is at least to: receive, via a local network, a message originated by the second agent. In some examples, the message originated by the second agent is destined to the control plane, and wherein the message is unable to be successfully transmitted to the control plane. In some examples, the message is broadcast via the local network, and wherein the message indicates that the failure event has occurred.

In some examples, at least one of the one or more commands further cause the second agent to cache one or more metrics or logs associated with the execution of the second one or more compute tasks.

In some examples, the first agent in serving as the control plane backup is further to: determine that a third agent is a higher priority control plane backup for the second agent as compared to the first agent, where the transmission of the one or more commands to the third agent occurs after the third agent has failed to act as the control plane backup.

In some examples, the first agent in serving as the control plane backup is further to: receive, from the control plane, a configuration update indicating that the second one or more compute tasks have completed or that the second agent is no longer associated with the second one or more compute tasks; and update, by the first agent, a mapping data structure to remove an association between the second agent and the second one or more compute tasks.

Figure 6:
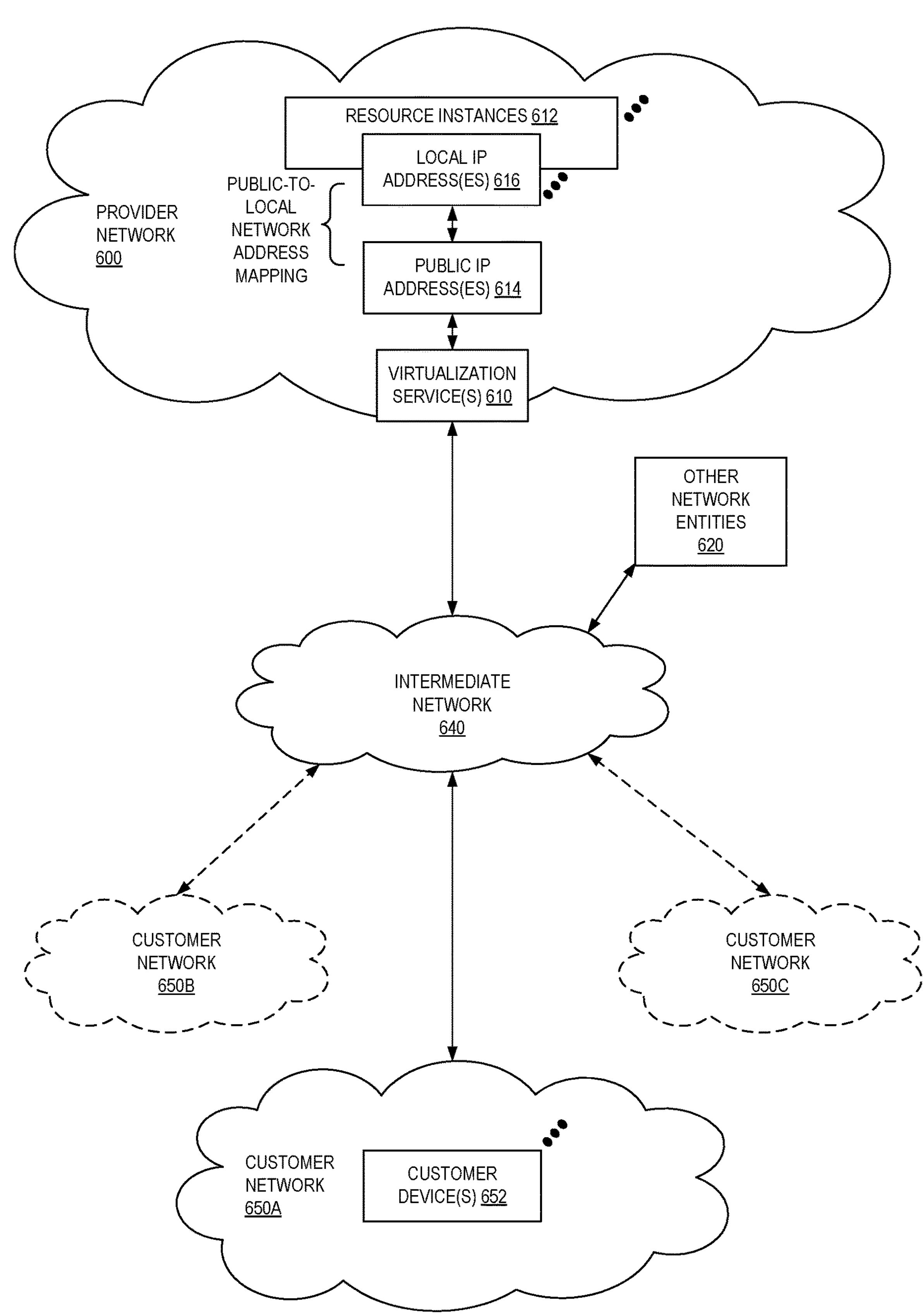
FIG. 6 illustrates an example provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
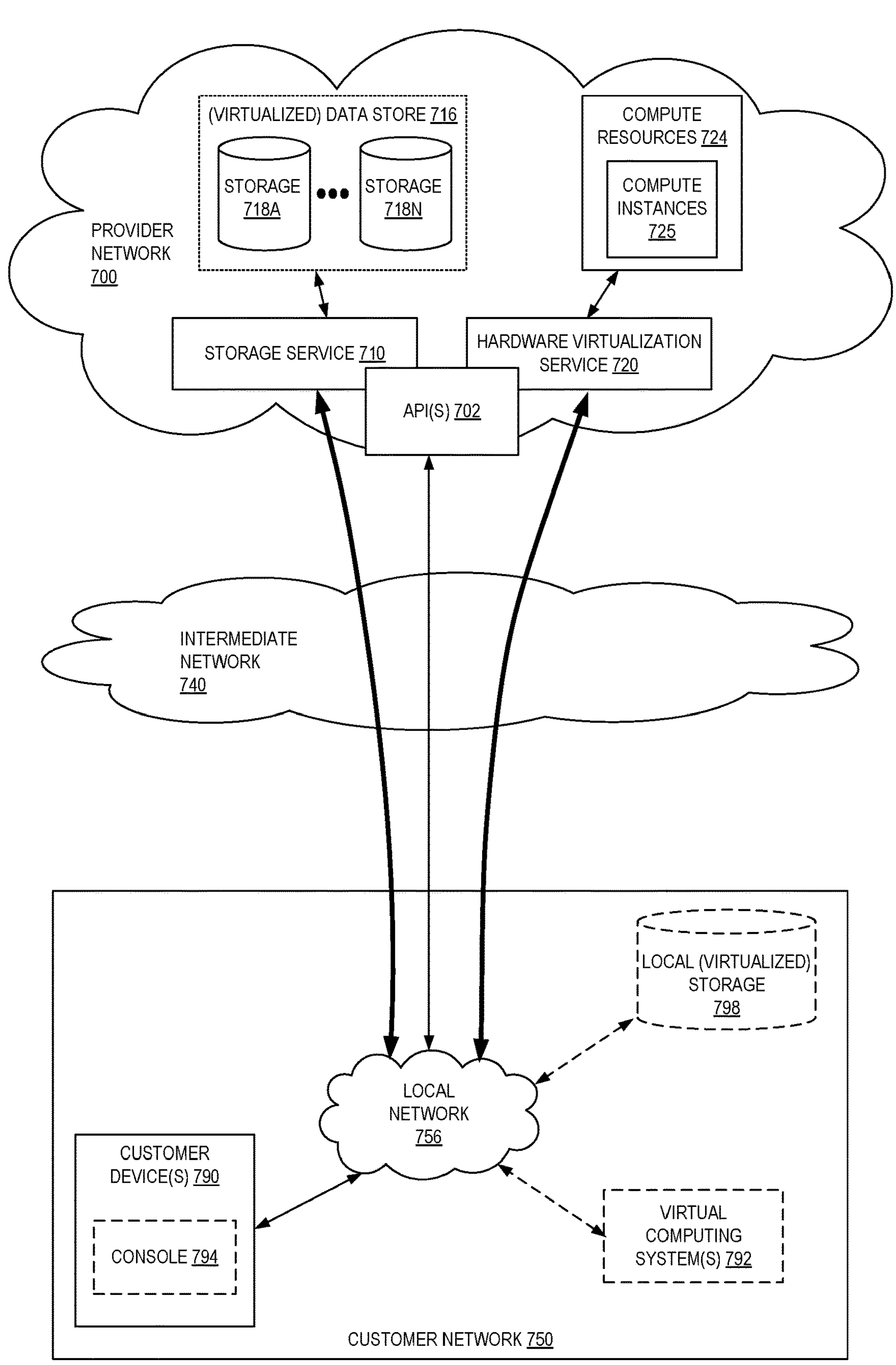
FIG. 7 is a block diagram of an example provider network that provides a storage service and a hardware virtualization service to customers according to some examples.

FIG. 7 is a block diagram of an example provider network environment that provides a storage service and a hardware virtualization service to customers, according to some examples. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some examples, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some examples, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
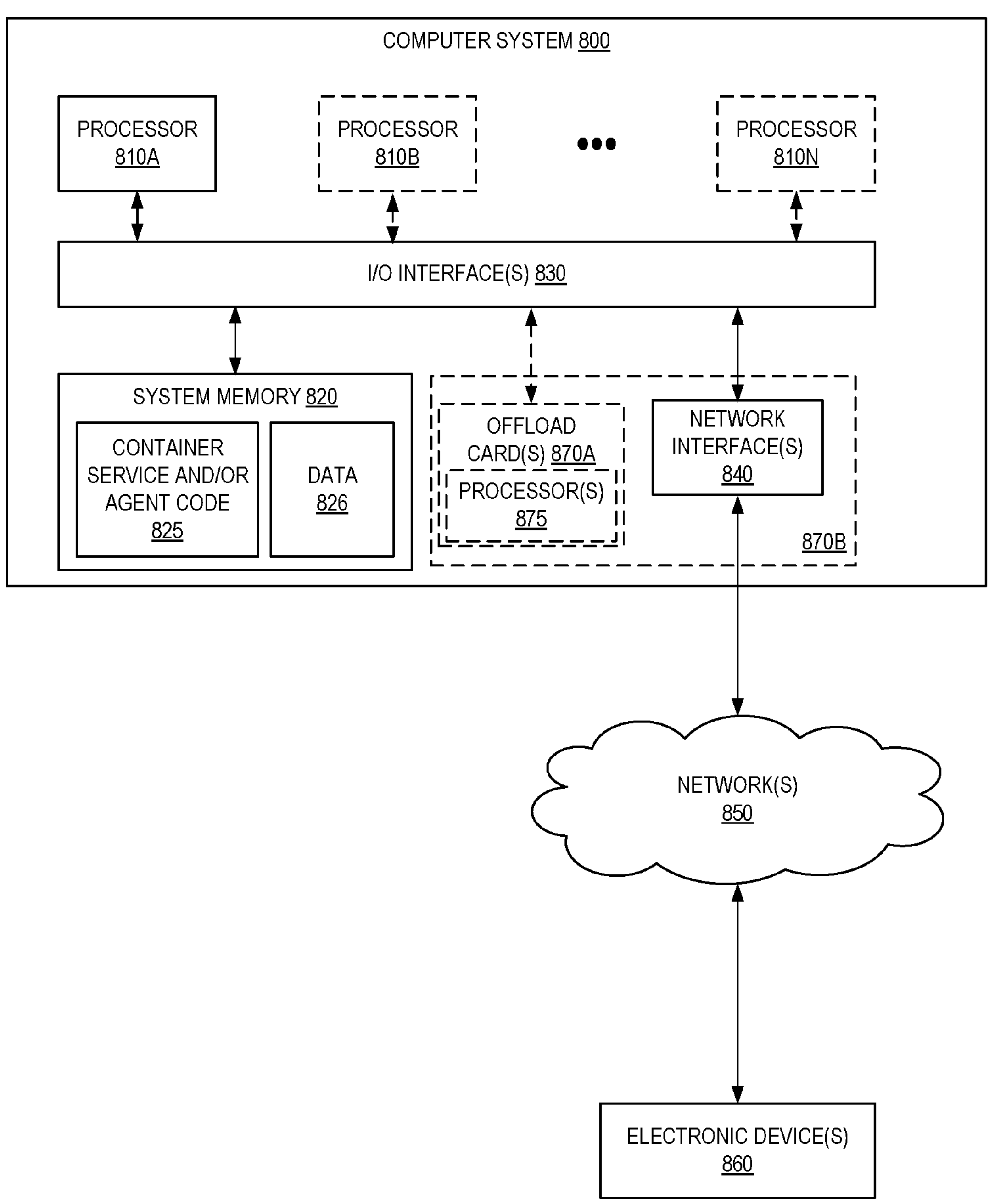
FIG. 8 is a block diagram illustrating an example computer system that can be used in some examples.

In some examples, a system that implements a portion or all of the techniques described herein can include a general-purpose computer system, such as the computer system 800 illustrated in FIG. 8, that includes, or is configured to access, one or more computer-accessible media. In the illustrated example, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various examples the computer system 800 can include one computing device or any number of computing devices configured to work together as a single computer system 800.

In various examples, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as container service and/or agent code 825 (e.g., executable to implement, in whole or in part, the container service 114 and/or agents 112) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computer system 800. However, in some examples the virtualization manager implemented by the offload card(s) 870A or 870B can accommodate requests from other entities (e.g., from compute instances themselves), and cannot coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 718A-718N) can be used to indicate that there can be one or multiple instances of the referenced entity in various examples, and when there are multiple instances, each does not need to be identical but can instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," "an example embodiment," etc., indicate that the example described can include a particular feature, structure, or characteristic, but every example can not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that can affect a determination or action. For example, a determination can be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A can be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:

transmitting, to a first agent by a control plane of a provider network, a first command to initiate execution of a first one or more compute tasks using one or more container instances, wherein the first agent is executed at a first computing device in a user-managed compute environment that is physically separate from the provider network and located at a premises of a customer of the provider network, wherein the first agent is configured to act upon a restart of another container instance by causing previously running compute tasks to be restarted when an external network connectivity issue exists between the another container instance and the control plane of the provider network, and wherein the first command causes the first agent to initiate execution of the first one or more compute tasks;

transmitting, to a second agent from the control plane, a second command to initiate execution of a second one or more compute tasks using one or more container instances, wherein the second agent is executed at a second computing device in the user-managed compute environment that is physically separate from the provider network and located at a premises of a customer of the provider network, and wherein the second command causes the second agent to initiate execution of the second one or more compute tasks; and transmitting, to the first agent in the user-managed compute environment from the control plane of the provider network, configuration data indicating that the first agent in the user-managed compute environment is to serve as a control plane backup for the second agent in the user-managed compute environment and further identifying the second one or more compute tasks, wherein the first agent in the user-managed compute environment, in serving as the control plane backup for the second agent in the user-managed compute environment, is to:

determine that a failure event associated with the second one or more compute tasks has occurred and that the second agent in the user-managed compute environment is unable to communicate with the control plane of the provider network; and responsive to determining that the failure event associated with the second one or more compute tasks has occurred and that the second agent in the user-managed compute environment is unable to communicate with the control plane of the provider network, transmit one or more commands to the second agent in the user-managed compute environment to cause the second agent in the user-managed compute environment to again execute the second one or more compute tasks.

2. The computer-implemented method of claim 1, wherein the first agent in serving as the control plane backup is further to:

identify, by the first agent prior to the determining that the failure event has occurred, a container image or a location associated with the container image based on the configuration data;

obtain, by the first agent, the container image;

cache, by the first agent, the container image; and after the determination of the failure event, transmit the container image to the second agent.

3. The computer-implemented method of claim 1, wherein:

the determination that the failure event has occurred includes a receipt, by the first agent via a local network, of a message originated by the second agent; and the message originated by the second agent was destined to the control plane or was broadcast via the local network.

4. A computer-implemented method comprising:

transmitting, by a provider network, commands to initiate execution of a first one or more compute tasks in association with a first agent and to initiate execution of a second one or more compute tasks in association with a second agent, wherein the first agent and the second agent execute at one or more computing devices in a user-managed compute environment that is physically separate from the provider network and located at a premises of a customer of the provider network, and wherein the first agent is configured to act upon a restart of a container instance by causing previously running compute tasks to be restarted when an external network connectivity issue exists between the container instance and a control plane of the provider network; and transmitting, by the provider network to the first agent in the user-managed compute environment, configuration data from the control plane of the provider network indicating that the first agent in the user-managed compute environment is to serve as a control plane backup for the second agent in the user-managed compute environment, wherein the first agent in the user-managed compute environment, in serving as the control plane backup for the second agent in the user-managed compute environment, is to:

determine that a failure event associated with the second one or more compute tasks has occurred and that the second agent in the user-managed compute environment is unable to communicate with the control plane of the provider network; and responsive to determining that the failure event associated with the second one or more compute tasks has occurred and that the second agent in the user-managed compute environment is unable to communicate with the control plane of the provider network, transmit one or more commands to the second agent in the user-managed compute environment to cause the second agent in the user-managed compute environment to again execute the second one or more compute tasks.

5. The computer-implemented method of claim 4, wherein the first agent in serving as the control plane backup is further to transmit, to the second agent, a computing resource or a location associated with the computing resource, wherein the second agent utilizes the computing resource to again execute the second one or more compute tasks.

6. The computer-implemented method of claim 5, wherein the first agent in serving as the control plane backup is further to:

identify, by the first agent prior to the determining that the that the failure event has occurred, the computing resource or the location associated with the computing resource based on the configuration data;

obtain, by the first agent, the computing resource; and cache, by the first agent, the computing resource, wherein the transmission of the computing resource or the location of the computing resource to the second agent includes a transmission of the computing resource.

7. The computer-implemented method of claim 5, wherein the computing resource comprises a container image, a virtual machine image, or code for an application.

8. The computer-implemented method of claim 4, wherein the failure event comprises a restart or fault of at least one of:

a physical computing device that executes the second agent;

a virtual machine instance associated with the second agent;

a container; or a container runtime.

9. The computer-implemented method of claim 4, wherein to determine that the failure event has occurred the first agent is at least to receive, via a local network, a message originated by the second agent.

10. The computer-implemented method of claim 9, wherein the message originated by the second agent is destined to the control plane of the provider network, and wherein the message is unable to be successfully transmitted to the control plane of the provider network.

11. The computer-implemented method of claim 9, wherein the message is broadcast via the local network, and wherein the message indicates that the failure event has occurred.

12. The computer-implemented method of claim 4, wherein at least one of the one or more commands further cause the second agent to cache one or more metrics or logs associated with the execution of the second one or more compute tasks.

13. The computer-implemented method of claim 4, wherein the first agent in serving as the control plane backup is further to:

determine that a third agent is a higher priority control plane backup for the second agent as compared to the first agent, wherein the transmission of the one or more commands to the third agent occurs after the third agent has failed to act as the control plane backup.

14. The computer-implemented method of claim 4, wherein the first agent in serving as the control plane backup is further to:

receive, from the control plane of the provider network, a configuration update indicating that the second one or more compute tasks have completed or that the second agent is no longer associated with the second one or more compute tasks; and update, by the first agent, a mapping data structure to remove an association between the second agent and the second one or more compute tasks.

15. A system comprising:

a first one or more electronic devices to implement a control plane of a service in a multi-tenant provider network; and a second one or more electronic devices to implement a first agent in a user-managed computing environment that is distinct from the multi-tenant provider network and located at a premises of a customer of the multi-tenant provider network, the first agent configured to act upon a restart of a container instance by causing previously running compute tasks to be restarted when an external network connectivity issue exists between the container instance and the control plane of the service in the multi-tenant provider network, the first agent including instructions that upon execution cause the first agent to:

receive configuration data from the control plane of the provider network indicating that the first agent in the user-managed computing environment is to serve as a control plane backup for a second agent in the user-managed computing environment that also executes in the user-managed computing environment, wherein the first agent in the user-managed computing environment is associated with a first one or more compute tasks launched from the control plane of the provider network and the second agent in the user-managed computing environment is associated with a second one or more compute tasks launched from the control plane of the provider network;

determine that a failure event associated with the second one or more compute tasks has occurred and that the second agent in the user-managed computing environment is unable to communicate with the control plane of the provider network; and responsive to determining that the failure event associated with the second one or more compute tasks has occurred and that the second agent in the user-managed computing environment is unable to communicate with the control plane of the provider network, transmit one or more commands to the second agent in the user-managed computing environment to cause the second agent in the user-managed computing environment to again execute the second one or more compute tasks.

16. The system of claim 15, wherein the first agent further includes instructions that upon execution cause the first agent to:

identify, prior to the determination that the that a failure event has occurred, a computing resource or a location associated with the computing resource based on the configuration data;

obtain the electronic resource; and cache the electronic resource.

17. The system of claim 16, wherein the computing resource comprises a container image, a virtual machine image, or code for an application.

18. The system of claim 15, wherein as part of the determination that the failure event has occurred the first agent is to receive, via a local network, a message originated by the second agent.

19. The system of claim 18, wherein:

the message originated by the second agent was destined to the control plane of the provider network; or the message is broadcast via the local network.

20. The system of claim 15, wherein the first agent further includes instructions that upon execution cause the first agent to:

receive, from the control plane of the provider network, a configuration update indicating that the second one or more compute tasks have completed or that the second agent is no longer associated with the second one or more compute tasks; and update a mapping data structure to remove an association between the second agent and the second one or more compute tasks.

* * * * *